US008890495B2

(12) United States Patent
Sinha et al.

(10) Patent No.: US 8,890,495 B2
(45) Date of Patent: Nov. 18, 2014

(54) POWER SUPPLY FOR INTEGRATED CIRCUIT

(71) Applicants: Samaksh Sinha, Singapore (SG); Garima Sharda, Ghaziabad (IN); Nishant Singh Thakur, Indore (IN)

(72) Inventors: Samaksh Sinha, Singapore (SG); Garima Sharda, Ghaziabad (IN); Nishant Singh Thakur, Indore (IN)

(73) Assignee: Freescale Semiconductor, Inc., Austin, TX (US)

( * ) Notice: Subject to any disclaimer, the term of this patent is extended or adjusted under 35 U.S.C. 154(b) by 198 days.

(21) Appl. No.: 13/748,598

(22) Filed: Jan. 24, 2013

(65) Prior Publication Data

US 2014/0203866 A1 Jul. 24, 2014

(51) Int. Cl.

*G05F 1/00* (2006.01)
*H02J 1/10* (2006.01)
*G05F 1/10* (2006.01)

(52) U.S. Cl.

CPC .................................... *G05F 1/10* (2013.01)
USPC .......................................... 323/268; 363/65

(58) Field of Classification Search

CPC ............. H02M 2001/0045; H02M 2001/0032; H02M 2001/0035; H02M 2001/0067; H02M 2001/007; H02M 2001/0074; H02M 2001/0077; H02M 2001/008; H02M 3/1584; H02M 3/156; H02M 7/493; H02M 1/36; G05F 1/565; G05F 1/575; Y02B 70/16
USPC ......... 323/223–226, 266–276, 282–285, 350, 323/351, 908; 363/49, 56.12, 65–70; 307/43, 58, 77, 80–82, 85–87; 713/300, 320–324, 340; 361/56, 361/88–90; 327/538–543
See application file for complete search history.

(56) References Cited

U.S. PATENT DOCUMENTS

| | | | | |
|---|---|---|---|---|
| 5,353,215 | A | 10/1994 | Dinwiddie | |
| 6,614,133 | B2 | 9/2003 | Belson | |
| 6,762,595 | B2 * | 7/2004 | Tamai et al. | 323/266 |
| 7,298,601 | B2 | 11/2007 | Covi | |
| 7,679,217 | B2 * | 3/2010 | Dishman et al. | 307/64 |
| 7,872,886 | B2 | 1/2011 | Xu | |
| 2007/0018620 | A1 * | 1/2007 | Fujii | 323/267 |
| 2011/0133709 | A1 * | 6/2011 | Mengad | 323/271 |
| 2012/0223687 | A1 * | 9/2012 | Liu et al. | 323/271 |

* cited by examiner

*Primary Examiner* — Timothy J Dole
*Assistant Examiner* — Carlos Rivera-Perez
(74) *Attorney, Agent, or Firm* — Charles Bergere

(57) ABSTRACT

A power supply that provides a supply voltage to an integrated circuit (IC) includes high and low power regulators and a power management circuit. The high power regulator regulates the supply voltage at a first voltage level and the low power regulator is set to an inactive mode when the IC is in a RUN mode. When the IC transitions from the RUN mode to a STOP mode, the high power regulator stops regulating and the supply voltage is maintained at a second voltage level, while the lower power regulator is set to an active mode for regulating the supply voltage at a third voltage level. A fall-back signal is generated when the supply voltage drops below a first threshold value after which the low power regulator is set in the inactive mode and the high power regulator is configured to regulate the supply voltage at a fourth voltage level.

17 Claims, 2 Drawing Sheets

POWER SUPPLY FOR INTEGRATED CIRCUIT

BACKGROUND OF THE INVENTION

The present invention relates generally to integrated circuits, and more particularly, to a power supply for an integrated circuit.

Integrated circuits (IC) include power supplies that provide different supply voltages to internal circuits of the IC. ICs operate in different power modes including RUN, STOP, and STANDBY modes. The RUN mode is a high power mode and the STOP and STANDBY modes are low power modes. Power supplies further regulate the supply voltage and include a high power regulator (HPREG) for regulating the supply voltage when the IC is in the high power mode and a low power regulator (LPREG) for regulating the supply voltage when the IC is in the low power mode.

The HPREG has a high current drive and is capable of sustaining high current surges. The power consumption of the HPREG is greater than the power consumption of the LPREG and therefore, the HPREG is turned off and the LPREG is turned on to save power when the IC is in a low power mode. However, in low power modes, leakage currents are generated in the internal circuits, which may reach the order of hundreds of milli-amperes as the junction temperature of the internal circuits reaches 125-150 degrees Celsius. The LPREG is designed to sustain a low order current and often fails to sustain an increased current requirement of the order of milli-amperes and causes the IC to reset. The LPREG further causes the IC to reset when transient load currents and DC load currents become unexpectedly high when the IC transitions from the RUN mode to the STOP mode.

The IC is rebooted in the event of a reset, which affects the system state and leads to loss of critical data and time. In systems such as automotive systems, system state is critical and it is preferable not to lose system state due to frequent resets.

One solution to tackle the above-mentioned problem is to design the LPREG such that it sustains the increased leakage current and high transient currents. However, it is difficult to predict total leakage current and transient currents, especially in automotive systems, where temperature variations are quite high and the leakage currents fluctuate with temperature variations. Even if an LPREG is designed using estimated leakage and transient currents, there is no fall back option available to prevent the IC from a reset and reboot caused by reasons other than leakage or transient currents.

Hence, there is a need for a power supply that efficiently regulates supply voltage, prevents an IC from a reset caused by leakage and transient currents, and overcomes the above-mentioned limitations of existing power supplies.

BRIEF DESCRIPTION OF THE DRAWINGS

The following detailed description of the preferred embodiments of the present invention will be better understood when read in conjunction with the appended drawings. The present invention is illustrated by way of example, and not limited by the accompanying figures, in which like references indicate similar elements. It is to be understood that the drawings are not to scale and have been simplified for ease of understanding the invention.

DETAILED DESCRIPTION OF THE PRESENT INVENTION

Figure 1:
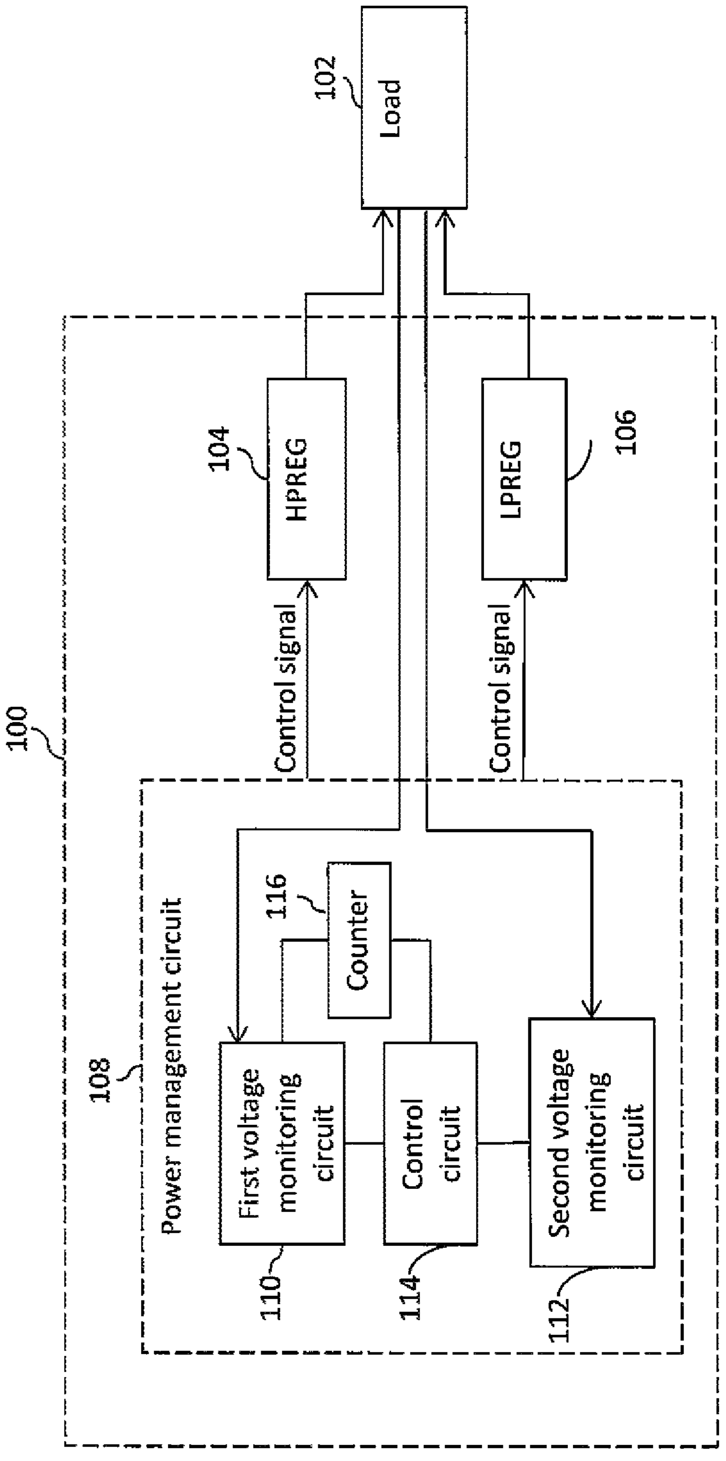
FIG. 1 is a schematic block diagram of a power supply for providing a supply voltage to an integrated circuit in accordance with an embodiment of the present invention.

The detailed description of the appended drawings is intended as a description of the currently preferred embodiments of the present invention, and is not intended to represent the only form in which the present invention may be practiced. It is to be understood that the same or equivalent functions may be accomplished by different embodiments that are intended to be encompassed within the spirit and scope of the present invention.

In an embodiment of the present invention, a power supply for providing a supply voltage to an integrated circuit, is provided. The power supply includes a high power regulator that regulates the supply voltage at a first voltage level when the IC is in a RUN mode and is maintained at a second voltage level when the IC transitions from the RUN mode to a STOP mode. The power supply includes a low power regulator that is set in an inactive mode when the IC is in the RUN mode and regulates the supply voltage at a third voltage level when the IC transitions from the RUN mode to the STOP mode. The power supply further includes a power management circuit connected to the high and low power regulators. The power management circuit includes a first voltage monitoring circuit that monitors the supply voltage regulated by the low power regulator when the IC transitions from the RUN mode to the STOP mode and generates a fallback signal when the supply voltage regulated by the low power regulator drops below a first voltage threshold. The power management circuit includes a control circuit that sets the low power regulator in the inactive mode and configures the high power regulator to regulate the supply voltage at a fourth voltage level when the fallback signal is active during a predefined time period when the IC transitions from the RUN mode to the STOP mode. The control circuit switches off the high power regulator and configures the low power regulator to continue regulating the supply voltage at the third voltage level when the fallback signal is not active during the predefined time period.

In another embodiment of the present invention, a method for providing a supply voltage to an IC is provided. The method includes maintaining the high power regulator at a second voltage level when the IC transitions from the RUN mode to a STOP mode. The method further includes configuring the low power regulator to regulate the supply voltage at a third voltage level when the IC transitions from the RUN mode to the STOP mode. The supply voltage regulated by the low power regulator is monitored when the IC transitions from the RUN mode to the STOP mode. A fallback signal is generated when the supply voltage regulated by the low power regulator drops below a first voltage threshold. The method further includes setting the low power regulator in an inactive mode and configuring the high power regulator to regulate the supply voltage at a fourth voltage level when the fallback signal is active during a predefined time period when the IC transitions from the RUN mode to the STOP mode. If the fallback signal is not active during the predefined time period, the high power regulator is switched off and the low power regulator is configured to continue regulating the supply voltage at the third voltage level.

Various embodiments of the present invention provide a power supply for regulating a supply voltage provided to an IC. The power supply includes high and low power regulators and a power management circuit for controlling the high and low power regulators when the IC is in various power modes (i.e., RUN, STOP and STANDBY modes). The high power regulator regulates the supply voltage at a first voltage level and the low power regulator is set in an inactive mode when the IC is in the RUN mode. When the IC transitions from the RUN mode to the STOP mode, the high power regulator stops regulating and is maintained at a second voltage level and the low power regulator is set in an active mode for regulating the supply voltage at a third voltage level. The power management circuit generates a fallback signal when the supply voltage regulated by the low power regulator drops below a first threshold (due to increased power requirements caused by leakage and transient currents) when the IC is in the STOP mode. The fallback signal sets the low power regulator in the inactive mode and configures the high power regulator to start regulating the supply voltage at a fourth voltage level and meet the increased power requirements. As the high power regulator is kept switched on for at least a predefined period when the IC enters the STOP mode from the RUN mode, a reset of the IC is prevented. Thus, the power supply of the present invention can be suitably used in critical systems, such as automotive systems, to prevent data and system state loss due to a reset caused by leakage and transient currents.

Referring now to FIG. 1, a power supply 100 for providing a supply voltage to a load 102 of an IC in accordance with an embodiment is shown. The IC may include a microcontroller unit (MCU), a system-on-chip (SoC), or an application specific integrated circuit (ASIC). For example, the power supply 100 may control the deployment mechanism of airbags in an automobile. The power supply 100 includes high and low power regulators (HPREG and LPREG) 104 and 106 that receive a supply voltage from a supply voltage source (not shown) of the IC and regulate the supply voltage at different voltage levels, based on a mode of operation of the IC and provide the regulated voltage to the load 102.

In various embodiments of the present invention, the IC operates in RUN, STOP, and STANDBY modes. However, it will be noted by those of skill in the art that other modes of operation could fall within these definitions, such SLEEP, and DEEP SLEEP modes, etc. The RUN mode is a high power mode and the STOP and STANDBY modes are low power modes. The load 102 may any digital or analog circuit or a combination thereof (i.e., a mixed signal circuit) that requires power management. When the IC is in the RUN mode, the HPREG 104 regulates the supply voltage provided to the load 102 at a first voltage level HPREG_HIGH and the LPREG 106 is set in an inactive mode. In the inactive mode, the LPREG 106 is either switched off or remains switched but it does not affect operation of the HPREG 104.

A power management circuit 108 is connected to the HPREG 104, the LPREG 106 and the load 102 and includes first and second voltage monitoring circuits 110 and 112, a control circuit 114 and a counter 116.

The power management circuit 108 generates control signals for controlling switching on/off of the HPREG 104 and LPREG 106 and also controlling magnitude at which the HPREG 104 and the LPREG 106 regulate the supply voltage in different modes of operation of the IC.

When the IC transitions from the RUN mode to the STOP mode, the control circuit 114 generates and provides a control signal to the HPREG 104 by way of which the HPREG 104 stops regulating but remains switched on at a second voltage level HPREG_LOW. The control circuit 114 further sets the LPREG 106 in an active mode for regulating the supply voltage at a third voltage level LPREG_LOW. In various embodiments of the present invention, the magnitude of HPREG_LOW is less than that of LPREG_LOW.

The first voltage monitoring circuit 110 monitors the supply voltage regulated by the LPREG 106 when the IC is in the STOP mode and generates a fallback signal when the supply voltage regulated by the LPREG 106 drops below a first voltage threshold MON_LVD. The fallback signal indicates that the power requirement of the load 102 has increased due to an increase in leakage and/or transient currents and the supply voltage regulated by the LPREG 106 (at the third voltage level LPREG_LOW) is insufficient to meet the increase in the power requirement.

The second voltage monitoring circuit 112 monitors both the supply voltage regulated by the LPREG 106 and HPREG 104 in various power modes of the IC, and generates a reset signal when the supply voltage regulated by the LPREG 106 or HPREG 104 drops below a second voltage threshold REG_LVD. The control circuit 114 resets the IC based on the reset signal. In various embodiments of the present invention, the second voltage threshold REG_LVD is lower than the first voltage threshold MON_LVD and the second voltage level HPREG_LOW is less than the first voltage threshold MON_LVD, which ensures that the fallback signal is generated before the reset signal.

The counter 116 measures and tracks the predefined time period. When the fallback signal is active during the predefined period, the control circuit 114 sets the LPREG 106 in the inactive mode and configures the HPREG 104 to regulate the supply voltage at a fourth voltage level HPREG_FALLBACK. In an embodiment of the present invention, the fourth voltage level HPREG_FALLBACK is either equal to or marginally greater than the third voltage level LPREG_LOW and sufficient to meet the increase in power requirement of the load 102.

The HPREG 104 remains switched on at the second voltage level HPREG_LOW for at least a predefined period when the IC transitions from the RUN mode to the STOP mode. The predefined period may be determined experimentally and signifies the time required for the leakage and/or transient currents to settle after the transition of the IC to the STOP mode is complete. Thus, the HPREG 104 quickly takes over from the LPREG 106 when the fallback signal is active during the predefined period and supplies the additional power needed to meet the increased power requirements of the load 102 and prevents the IC from unnecessary reset.

If the fallback signal is not active during the predefined time period, the control circuit 114 switches off the HPREG 104 and the LPREG 106 continues to regulate the supply voltage at the third voltage level LPREG_LOW, until the fallback signal is generated or until the IC transitions from the STOP mode to the RUN mode. The first voltage monitoring circuit 110 continues monitoring the supply voltage regulated by the LPREG 106 and generates the fallback signal if the supply voltage regulated by the LPREG 106 drops below the first voltage threshold MON_LVD. Upon generation of the fallback signal, the control circuit 114 switches on the HPREG 104 and sets the LPREG 106 in the inactive mode. The HPREG 104 initially starts regulating the supply voltage at the second voltage level and quickly ramps up the voltage to the fourth voltage level and provides the surplus power to the load 102 as explained above.

Figure 2:
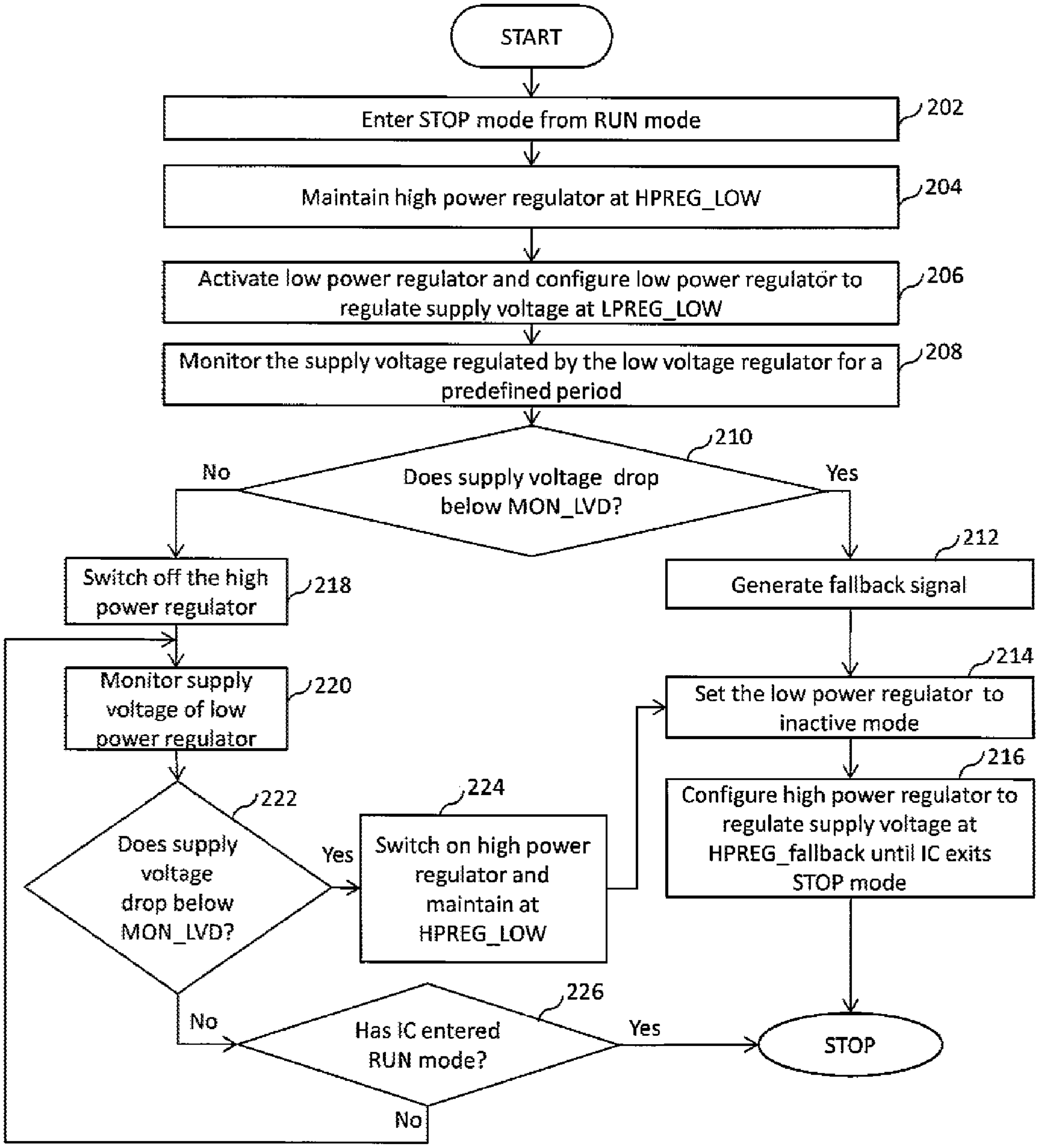
FIG. 2 is a flow chart illustrating a method for providing a supply voltage to an integrated circuit in accordance with an embodiment of the present invention.

Referring now to FIG. 2, a flowchart illustrating a method for providing the supply voltage to the IC by the power supply 100 in accordance with an embodiment of the present invention is shown. Steps of the flowchart are explained in conjunction with FIG. 1. Further, the flowchart has been explained using the following exemplary voltage magnitudes: HPREG_HIGH=1.2V, HPREG_LOW=1.17V, LPREG_LOW=1.19V, HPREG_FALLBACK=1.19V, MON_LVD=1.18V and REG_LVD=1.13V.

The LPREG 106 is set in an inactive mode and the HPREG 104 regulates the supply voltage at 1.2V in the RUN mode. At step 202, the IC transitions from the RUN mode to the STOP mode. At step 204, the HPREG 104 remains switched on and maintains the supply voltage at 1.17V. At step 206, the LPREG 106 is set in the active mode and is configured to regulate the supply voltage at 1.19V.

At step 208, the supply voltage regulated by the LPREG 106 is monitored by the first voltage monitoring circuit 110 for a predefined time period of 100 μs and at step 210, it is checked if the supply voltage drops below 1.18V. At step 212, the control circuit 114 generates a fallback signal if the supply voltage regulated by the LPREG 106 drops below 1.18V during the predefined period. At step 214, the LPREG 106 is set in the inactive mode and at step 216, the HPREG 104 is configured to regulate the supply voltage at 1.19V until the IC exits the STOP mode.

If the supply voltage does not drop below 1.18V during the predefined time period 100 μs, step 218 is executed at which the HPREG 104 is switched off and at step 220, the first voltage monitoring circuit 110 continues monitoring the supply voltage regulated by the LPREG 106. At step 222, it is checked whether the supply voltage drops below 1.18V. If the supply voltage drops below 1.18V, then at step 224, the HPREG 104 is switched on and the supply voltage is maintained at 1.17V, after which steps 214 to 216 are repeated until the IC exits the STOP mode. If the supply voltage does not drop below 1.18V at step 222, then it is checked at step 226 to determine whether the IC enter has entered the RUN mode. If IC remains in the STOP mode, then steps 220 to 226 are repeated until the IC exits the STOP mode and enters the RUN mode.

While particular embodiments of the present invention have been shown and described, it will be recognized to those skilled in the art that, based upon the teachings herein, further changes and modifications may be made without departing from this invention and its broader aspects, and thus, the appended claims are to encompass within their scope all such changes and modifications as are within the true spirit and scope of this invention.

The invention claimed is:

1. A power supply for providing a supply voltage to an integrated circuit, comprising:

a high power regulator that regulates the supply voltage at a first voltage level when the integrated circuit is in a RUN mode and wherein the supply voltage is maintained at a second voltage level when the integrated circuit transitions from the RUN mode to a STOP mode;

a low power regulator that is set in an inactive mode when the integrated circuit is in the RUN mode, and regulates the supply voltage at a third voltage level when the integrated circuit transitions from the RUN mode to the STOP mode; and a power management circuit, connected to the high and low power regulators, and including:

a first voltage monitoring circuit that monitors the supply voltage regulated by the low power regulator when the integrated circuit transitions from the RUN mode to the STOP mode and generates a fallback signal when the supply voltage regulated by the low power regulator drops below a first voltage threshold; and a control circuit that sets the low power regulator in the inactive mode and configures the high power regulator to regulate the supply voltage at a fourth voltage level when the fallback signal is active during a predefined time period when the integrated circuit transitions from the RUN mode to the STOP mode, and wherein the control circuit switches off the high power regulator and configures the low power regulator to continue regulating the supply voltage at the third voltage level when the fallback signal is not active during the predefined time period.

2. The power supply of claim 1, wherein the power management circuit further comprises a second voltage monitoring circuit for monitoring the supply voltage regulated by the high and low power regulators and generating a reset signal when the supply voltage drops below a second voltage threshold.

3. The power supply of claim 2, wherein the control circuit resets the integrated circuit based on the reset signal.

4. The power supply of claim 2, wherein the second voltage level is less than the third voltage level and greater than the second voltage threshold.

5. The power supply of claim 1, wherein the control circuit further switches on the high power regulator to maintain the supply voltage at the second voltage level, sets the low power regulator in the inactive mode, and then configures the high power regulator to regulate the supply voltage at the fourth voltage level when the fallback signal is active during the predefined time period.

6. The power supply of claim 1, wherein the power management circuit further includes a counter for tracking the predefined time period.

7. A power supply for providing a supply voltage to an integrated circuit, comprising:

a high power regulator that regulates the supply voltage at a first voltage level when the integrated circuit is in a RUN mode and maintains the supply voltage at a second voltage level when the integrated circuit transitions from the RUN mode to a STOP mode;

a low power regulator that is set in an inactive mode when the integrated circuit is in the RUN mode, and regulates the supply voltage at a third voltage level when the integrated circuit transitions from the RUN mode to the STOP mode; and a power management circuit, connected to the high and low power regulators, comprising:

a first voltage monitoring circuit that monitors the supply voltage regulated by the low power regulator when the integrated circuit transitions from the RUN mode to the STOP mode and generates a fallback signal when the supply voltage regulated by the low power regulator drops below a first voltage threshold; and a control circuit that sets the low power regulator in the inactive mode, and configures the high power regulator to regulate the supply voltage at a fourth voltage level when the fallback signal is active during a predefined time period when the integrated circuit transitions from the RUN mode to the STOP mode, and wherein the control circuit switches off the high power regulator and configures the low power regulator to continue regulating the supply voltage at the third voltage level when the fallback signal is not active during the predefined time period, and wherein the control circuit switches on and maintains the high power regulator at the second voltage level, sets the low power regulator in the inactive mode, and configures the high power regulator to regulate the supply voltage at the fourth voltage level when the fallback signal is active after the predefined time period.

8. The power supply of claim 7, wherein the power management circuit further comprises a second voltage monitoring circuit for monitoring the supply voltage regulated by the high and low power regulators and generating a reset signal when the supply voltage drops below a second voltage threshold.

9. The power supply of claim 8, wherein the control circuit resets the integrated circuit based on the reset signal.

10. The power supply of claim 8, wherein the second voltage level voltage is less than the third voltage level and greater than the second voltage threshold.

11. The power supply of claim 7, wherein the power management circuit further comprises a counter connected to the control circuit and the first voltage monitoring circuit for tracking the predefined time period.

12. A method for providing a supply voltage to an integrated circuit by a power supply, wherein the power supply includes a high power regulator configured to regulate the supply voltage at a first voltage level when the integrated circuit is in a RUN mode and a low power regulator that is set in an inactive mode when the integrated circuit is in the RUN mode, the method comprising:

the high power regulator maintaining the supply voltage at a second voltage level when the integrated circuit transitions from the RUN mode to a STOP mode;

configuring the low power regulator to regulate the supply voltage at a third voltage level when the integrated circuit transitions from the RUN mode to the STOP mode;

monitoring the supply voltage regulated by the low power regulator when the integrated circuit transitions from the RUN mode to the STOP mode;

generating a fallback signal when the supply voltage regulated by the low power regulator drops below a first voltage threshold;

setting the low power regulator in the inactive mode and configuring the high power regulator to regulate the supply voltage at a fourth voltage level when the fallback signal is active during a predefined time period when the integrated circuit transitions from the RUN mode to the STOP mode; and switching off the high power regulator and configuring the low power regulator to continue regulating the supply voltage at the third voltage level when the fallback signal is inactive during the predefined time period.

13. The method of claim 12, further comprising monitoring the supply voltage regulated by the low and high power regulators and generating a reset signal when the supply voltage drops below a second voltage threshold.

14. The method of claim 13, further comprising resetting the integrated circuit based on the reset signal.

15. The method of claim 13, wherein the second voltage level voltage is less than the third voltage level and greater than the second voltage threshold.

16. The method of claim 12, further comprising switching on the high power regulator and maintaining the supply voltage at the second voltage level when the fallback signal is active after the predefined time period.

17. The method of claim 16, further comprising setting the low power regulator in the inactive mode and configuring the high power regulator to regulate the supply voltage at the fourth voltage level when the fallback signal is active after the predefined time period.

* * * * *